(12) United States Patent
Crane et al.

(10) Patent No.: US 8,299,644 B2
(45) Date of Patent: Oct. 30, 2012

(54) ENERGY STORAGE SYSTEM UTILIZING COMPRESSED GAS

(75) Inventors: Stephen E. Crane, Santa Rosa, CA (US); Danielle A. Fong, Berkeley, CA (US); Edwin P. Berlin, Jr., Oakland, CA (US)

(73) Assignee: Lightsail Energy, Inc., Berkeley, CA (US)

( * ) Notice: Subject to any disclaimer, the term of this patent is extended or adjusted under 35 U.S.C. 154(b) by 0 days.

(21) Appl. No.: 13/356,188

(22) Filed: Jan. 23, 2012

(65) Prior Publication Data

US 2012/0119514 A1 May 17, 2012

Related U.S. Application Data

(63) Continuation of application No. 12/730,549, filed on Mar. 24, 2010, now Pat. No. 8,247,915.

(51) Int. Cl.
*F03D 9/00* (2006.01)
*H02P 9/04* (2006.01)

(52) U.S. Cl. ............................ 290/44; 290/55

(58) Field of Classification Search .......... 290/44, 290/55; 60/641.1, 641, 2, 398; 415/4.2, 415/4.5
See application file for complete search history.

(56) References Cited

U.S. PATENT DOCUMENTS

| | | | | |
|---|---|---|---|---|
| 1,456,765 A * | 5/1923 | Cupp | | 60/325 |
| 3,952,723 A * | 4/1976 | Browning | | 126/247 |
| 4,229,661 A * | 10/1980 | Mead et al. | | 290/44 |
| 4,476,851 A * | 10/1984 | Brugger et al. | | 126/247 |
| 4,784,570 A * | 11/1988 | Bond | | 416/170 R |
| 5,121,607 A | 6/1992 | George, Jr. | | |
| 5,680,764 A | 10/1997 | Viteri | | |
| 6,962,053 B2 * | 11/2005 | Gebel et al. | | 60/641.1 |
| 2003/0105556 A1 * | 6/2003 | Enis et al. | | 700/286 |
| 2005/0274334 A1 | 12/2005 | Warren | | |
| 2006/0137348 A1 * | 6/2006 | Pas | | 60/641.1 |
| 2006/0266037 A1 * | 11/2006 | Ingersoll | | 60/641.1 |
| 2008/0050234 A1 * | 2/2008 | Ingersoll et al. | | 416/132 B |
| 2010/0060013 A1 * | 3/2010 | Csefk | | 290/55 |
| 2010/0117372 A1 * | 5/2010 | McMaster | | 290/55 |
| 2011/0042959 A1 * | 2/2011 | Kelly | | 290/55 |

OTHER PUBLICATIONS

International Search Report and Written Opinion for PCT/US2012/021923 filed on Jan. 19, 2012.

* cited by examiner

*Primary Examiner* — Julio C. Gonzalez R.

(57) ABSTRACT

An energy storage and recovery system employs air compressed utilizing power from an operating wind turbine. This compressed air is stored within one or more chambers of a structure supporting the wind turbine above the ground. By functioning as both a physical support and as a vessel for storing compressed air, the relative contribution of the support structure to the overall cost of the energy storage and recovery system may be reduced, thereby improving economic realization for the combined turbine/support apparatus. In certain embodiments, expansion forces of the compressed air stored within the chamber, may be relied upon to augment the physical stability of a support structure, further reducing material costs of the support structure.

18 Claims, 6 Drawing Sheets

ENERGY STORAGE SYSTEM UTILIZING COMPRESSED GAS

BACKGROUND

Air compressed to 300 bar has energy density comparable to that of lead-acid batteries and other energy storage technologies. One source of compressed air is wind.

It is known that the efficiency of power generation from wind, improves with increased height of elevation of the fan blades of the wind turbine from the ground. Such elevation, however, requires provision of a large, fixed structure of sufficient mechanical strength to safely support the relatively heavy structure of the turbine, including the blades, under a variety of wind conditions.

The expense of constructing and maintaining such a support structure is an inherent expense of the system, detracting from the overall profitability of the wind generation device. Accordingly, there is a need in the art for novel structures and methods for supporting a wind turbine.

SUMMARY

An energy storage and recovery system employs air compressed utilizing power from an operating wind turbine. This compressed air is stored within one or more chambers of a structure supporting the wind turbine above the ground. By functioning as both a physical support and as a vessel for storing compressed air, the relative contribution of the support structure to the overall cost of the energy storage and recovery system may be reduced, thereby improving economic realization for the combined turbine/support apparatus. In certain embodiments, expansion forces of the compressed air stored within the chamber may be relied upon to augment the physical stability of a support structure, further reducing material costs of the support structure.

An embodiment of a method in accordance with the present invention comprises storing compressed gas generated from power of an operating wind turbine, within a chamber defined by walls of a structure supporting the wind turbine.

An embodiment of an apparatus in accordance with the present invention comprises a support structure configured to elevate a wind turbine above the ground, the support structure comprising walls defining a chamber configured to be in fluid communication with a gas compressor operated by the wind turbine, the chamber also configured to store gas compressed by the compressor.

An embodiment of an apparatus in accordance with the present invention comprises an energy storage system comprising a wind turbine, a gas compressor configured to be operated by the wind turbine, and a support structure configured to elevate the wind turbine above the ground, the support structure comprising walls defining a chamber in fluid communication with the gas compressor, the chamber configured to store gas compressed by the gas compressor. A generator is configured to generate electrical power from expansion of compressed gas flowed from the chamber.

BRIEF DESCRIPTION OF THE DRAWINGS

FIG. 1AA shows a simplified cross-sectional view of the planetary gear system of FIG. 1A taken along line 1A-1A'.

While certain drawings and systems depicted herein may be configured using standard symbols, the drawings have been prepared in a more general manner to reflect the variety implementations that may be realized from different embodiments.

DETAILED DESCRIPTION

As previously described, a wind turbine operates to capture wind energy more effectively the higher it is elevated above the ground. In particular, wind speed is roughly proportional to the seventh root of the height. Power is proportional to the cube of the wind speed, and also proportional to the area of the wind turbine. A greater height, H, could theoretically allow a larger diameter turbine, giving area proportional to $H^2$ and power proportional to $H^x$, with x perhaps as great as $2\frac{3}{7}$. The support structure is thus a necessary element of the system. According to embodiments of the present invention, this support structure can perform the further duty of housing one or more chambers or vessels configured to receive and store compressed air generated from output of the wind turbine.

Such a support structure for a wind turbine is initially well suited for this task, as it is typically formed from an exterior shell that encloses an interior space. This structure provides the desired mechanical support for the wind turbine at the top, while not consuming the large amount of material and avoiding the heavy weight that would otherwise be associated with an entirely solid supporting structure.

Figure 1:
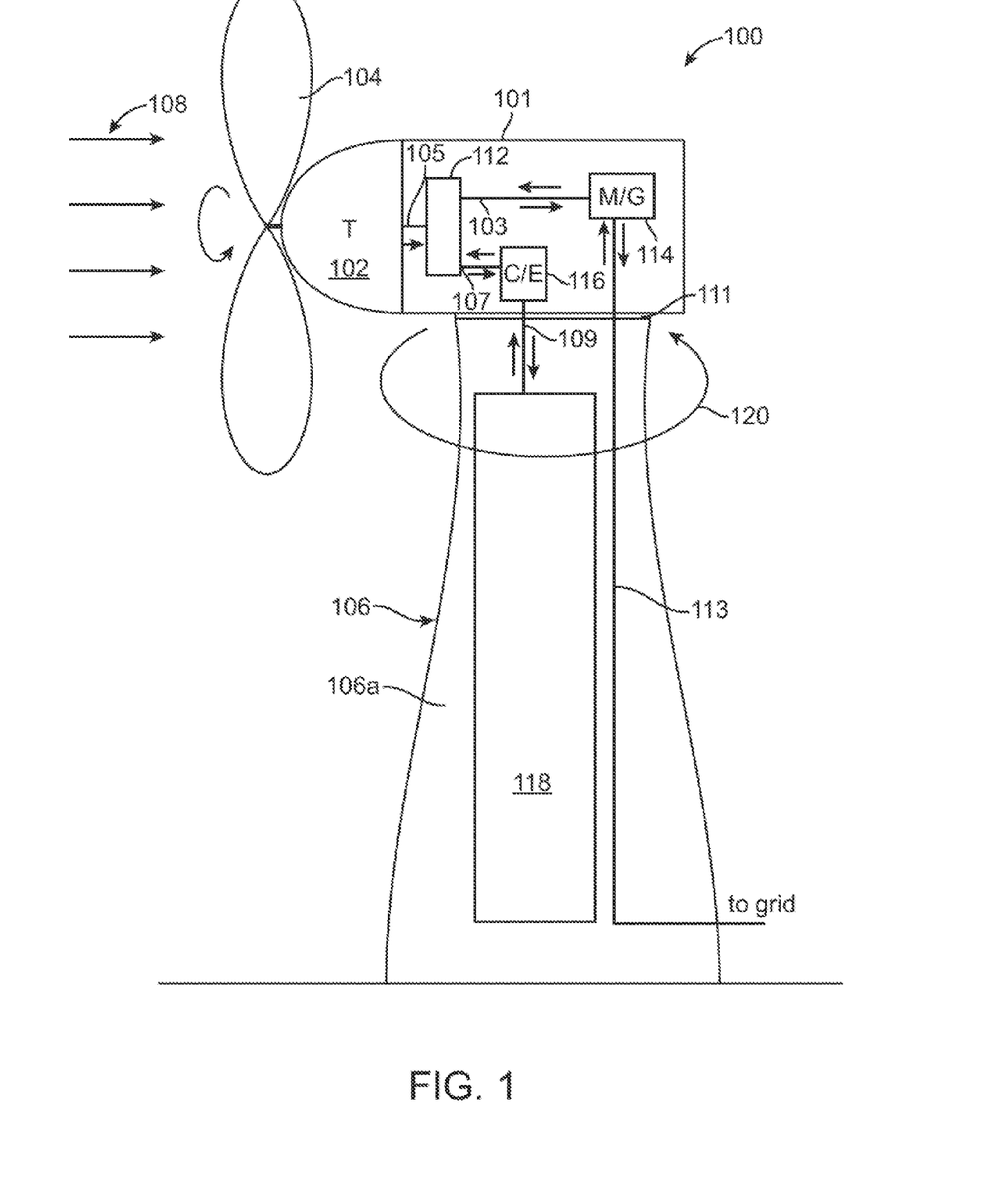
FIG. 1 is a simplified schematic representation of an embodiment of a system in accordance with the present invention.

FIG. 1 shows a simplified schematic view of an embodiment of a system in accordance with the present invention. Specifically, system 100 comprises a nacelle 101 that is positioned on top of support tower 106. Nacelle 101 includes a wind turbine 102 having rotatable blades 104.

Nacelle 101 may be in rotatable communication (indicated by arrow 120) with support tower 106 through joint 111, thereby allowing the blades of the wind turbine to be oriented to face the direction of the prevailing wind. An example of a wind turbine suitable for use in accordance with embodiment of the present invention is the model 1.5 sle turbine available from the General Electric Company of Fairfield, Conn.

Upon exposure to wind 108, the blades 104 of the turbine 102 turn, thereby converting the power of the wind into energy that is output on linkage 105. Linkage 105 may be mechanical, hydraulic, or pneumatic in nature.

Linkage 105 is in turn in physical communication with a motor/generator 114 through gear system 112 and linkage 103. Gear system 112 is also in physical communication with compressor/expander element 116 through linkage 107. Linkages 103 and 107 may be mechanical, hydraulic, or pneumatic in nature.

The gear system may be configured to permit movement of all linkages at the same time, in a subtractive or additive manner. The gear system may also be configured to accommodate movement of fewer than all of the linkages. In certain embodiments, a planetary gear system may be well-suited to perform these tasks.

Compressed gas storage chamber 118 is defined within the walls 118a of the support tower. Compressor/expander 116 is in fluid communication with storage chamber 118 through conduit 109.

Several modes of operation of system 100 are now described. In one mode of operation, the wind is blowing, and demand for power on the grid is high. Under these conditions, substantially all of the energy output from rotation of the blades of the turbine, is communicated through linkages 105 and 103 and gear system 112 to motor/generator 114 that is acting as a generator. Electrical power generated by motor/generator 114 is in turn communicated through conduit 113 to be output onto the grid for consumption. The compressor/expander 116 is not operated in this mode.

In another mode of operation, the wind is blowing but demand for power is not as high. Under these conditions, a portion of the energy output from rotation of the blades of the turbine is converted into electrical power through elements 105, 112, 103, and 114 as described above.

Moreover, some portion of the energy output from the operating turbine is also communicated through linkages 105 and 107 and gear system 112 to operate compressor/expander 116 that is functioning as a compressor. Compressor/expander 116 functions to intake air, compress that air, and then flow the compressed air into the storage chamber 118 located in the support tower. As described below, energy that is stored in the form of this compressed air can later be recovered to produce useful work.

Specifically, in another mode of operation of system 100, the compressor/expander 116 is configured to operate as an expander. In this mode, compressed air from the storage chamber is flowed through conduit 109 into the expander 116, where it is allowed to expand. Expansion of the air drives a moveable element that is in physical communication with linkage 107. One example of such a moveable element is a piston that is positioned within a cylinder of the compressor/expander 116.

The energy of actuated linkage 107 is in turn communicated through gear system 112 and linkage 103 to motor/generator 114 that is acting as a generator. Electrical power generated by motor/generator as a result of actuation of linkage 103, may in turn be output to the power grid through conduit 113.

In the mode of operation just described, the wind may or may not be blowing. If the wind is blowing, the energy output by the compressor/expander 116 may be combined in the gear system with the energy output by the turbine 112. The combined energy from these sources (wind, compressed air) may then be communicated by gear system 112 through linkage 103 to motor/generator 114.

In still another mode of operation, the wind may not be blowing and power demand is low. Under these conditions, the compressor/expander 116 may operate as a compressor. The motor/generator 114 operates as a motor, drawing power off of the grid to actuate the compressor/expander 116 (functioning as a compressor) through linkages 103 and 107 and gear system 112. This mode of operation allows excess power from the grid to be consumed to replenish the compressed air stored in the chamber 118 for consumption at a later time.

Embodiments of systems which provide for the efficient storage and recovery of energy as compressed gas, are described in the U.S. Provisional Patent Application No. 61/221,487 filed Jun. 29, 2009, and in the U.S. nonprovisional patent application Ser. No. 12/695,922 filed Jan. 28, 2010, both of which are incorporated by reference in their entireties herein for all purposes. However, embodiments of the present invention are not limited to use with these or any other particular designs of compressed air storage and recovery systems. Also incorporated by reference in its entirety herein for all purposes, is the provisional patent application No. 61/294,396, filed Jan. 12, 2010.

As previously mentioned, certain embodiments of the present invention may favorably employ a planetary gear system to allow the transfer of mechanical energy between different elements of the system. In particular, such a planetary gear system may offer the flexibility to accommodate different relative motions between the linkages in the various modes of operation described above.

Figure 1A:
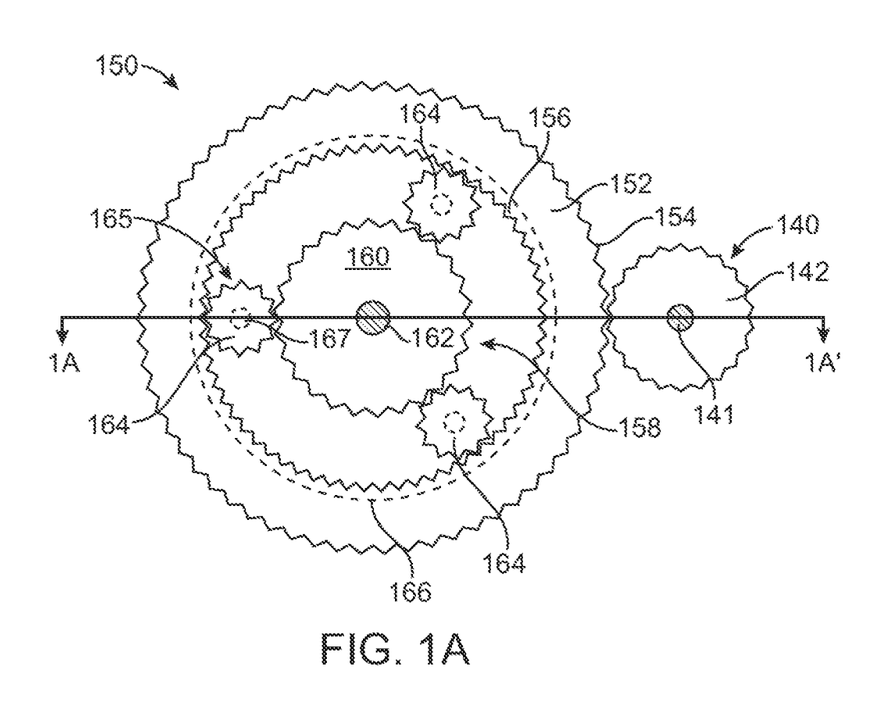
FIG. 1A shows a simplified top view of one embodiment of a planetary gear system which could be used in embodiments of the present invention.

FIG. 1A shows a simplified top view of one embodiment of a planetary gear system which could be used in embodiments of the present invention. FIG. 1AA shows a simplified cross-sectional view of the planetary gear system of FIG. 1A taken along line 1A-1A'.

Specifically, planetary gear system 150 comprises a ring gear 152 having a first set of teeth 154 on an outer periphery, and having a second set of teeth 156 on an inner portion. Ring gear 152 is engaged with, and moveable in either direction relative to, three other gear assemblies.

In particular, first gear assembly 140 comprises side gear 142 that is positioned outside of ring gear 152, and is fixed to rotatable shaft 141 which serves as a first linkage to the planetary gear system. The teeth of side gear 142 are in mechanical communication with the teeth 154 located on the outer periphery of the ring gear. Rotation of shaft 141 in either direction will translate into a corresponding movement of ring gear 152.

A second gear assembly 158 comprises a central (sun) gear 160 that is positioned inside of ring gear 152. Central gear 160 is fixed to rotatable shaft 162 which serves as a second linkage to the planetary gear system.

Third gear assembly 165 allows central gear 160 to be in mechanical communication with the second set of teeth 156 of ring gear 152. In particular, third gear assembly 165 comprises a plurality of (planet) gears 164 that are in free rotational communication through respective pins 167 with a (planet carrier) plate 166. Plate 166 is fixed to a third shaft 168 serving as a third linkage to the planetary gear system.

The planetary gear system 150 of FIGS. 1A-1AA provides mechanical communication with three rotatable linkages 141, 162, and 168. Each of these linkages may be in physical communication with the various other elements of the system, for example the wind turbine, a generator, a motor, a motor/generator, a compressor, an expander, or a compressor/expander.

The planetary gear system 150 permits movement of all of the linkages at the same time, in a subtractive or additive manner. For example where the wind is blowing, energy from the turbine linkage may be distributed to drive both the linkage to a generator and the linkage to a compressor. In another example, where the wind is blowing and demand for energy is high, the planetary gear system permits output of the turbine linkage to be combined with output of an expander linkage, to drive the linkage to the generator.

Moreover, the planetary gear system is also configured to accommodate movement of fewer than all of the linkages. For example, rotation of shaft 141 may result in the rotation of shaft 162 or vice-versa, where shaft 168 is prevented from rotating. Similarly, rotation of shaft 141 may result in the rotation of only shaft 168 and vice-versa, or rotation of shaft 162 may result in the rotation of only shaft 168 and vice-versa. This configuration allows for mechanical energy to be selectively communicated between only two elements of the system, for example where the wind turbine is stationary and it is desired to operate a compressor based upon output of a motor.

Returning to FIG. 1, certain embodiments of compressed gas storage and recovery systems according to the present invention may offer a number of potentially desirable characteristics. First, the system leverages equipment that may be present in an existing wind turbine system. That is, the compressed air energy storage and recovery system may utilize the same electrical generator that is used to output power from the wind turbine onto the grid. Such use of the generator to generate electrical power both from the wind and from the stored compressed air, reduces the cost of the overall system.

Another potential benefit associated with the embodiment of FIG. 1 is improved efficiency of power generation. Specifically, the mechanical energy output by the rotating wind turbine blades, is able to be communicated in mechanical form to the compressor without the need for conversion into another form (such as electrical energy). By utilizing the output of the power source (the wind turbine) in its native mechanical form, the efficiency of transfer of that power into compressed air may be enhanced.

Still another potential benefit associated with the embodiment of FIG. 1 is a reduced number of components. In particular, two of the elements of the system perform dual functions. Specifically, the motor/generator can operate as a motor and as a generator, and the compressor/expander can operate as a compressor or an expander. This eliminates the need for separate, dedicated elements for performing each of these functions.

Still another potential benefit of the embodiment of FIG. 1 is relative simplicity of the linkages connecting various elements with moving parts. Specifically, in the embodiment of FIG. 1, the turbine, the gear system, the motor/generator, and the compressor/expander are all located in the nacelle. Such a configuration offers the benefit of compatibility with a rotational connection between a nacelle and the underlying support structure. In particular, none of the linkages between the elements needs to traverse the rotating joint, and thus the linkages do not need to accommodate relative motion between the nacelle and support structure. Such a configuration allows the design and operation of those linkages to be substantially simplified.

Figure 2:
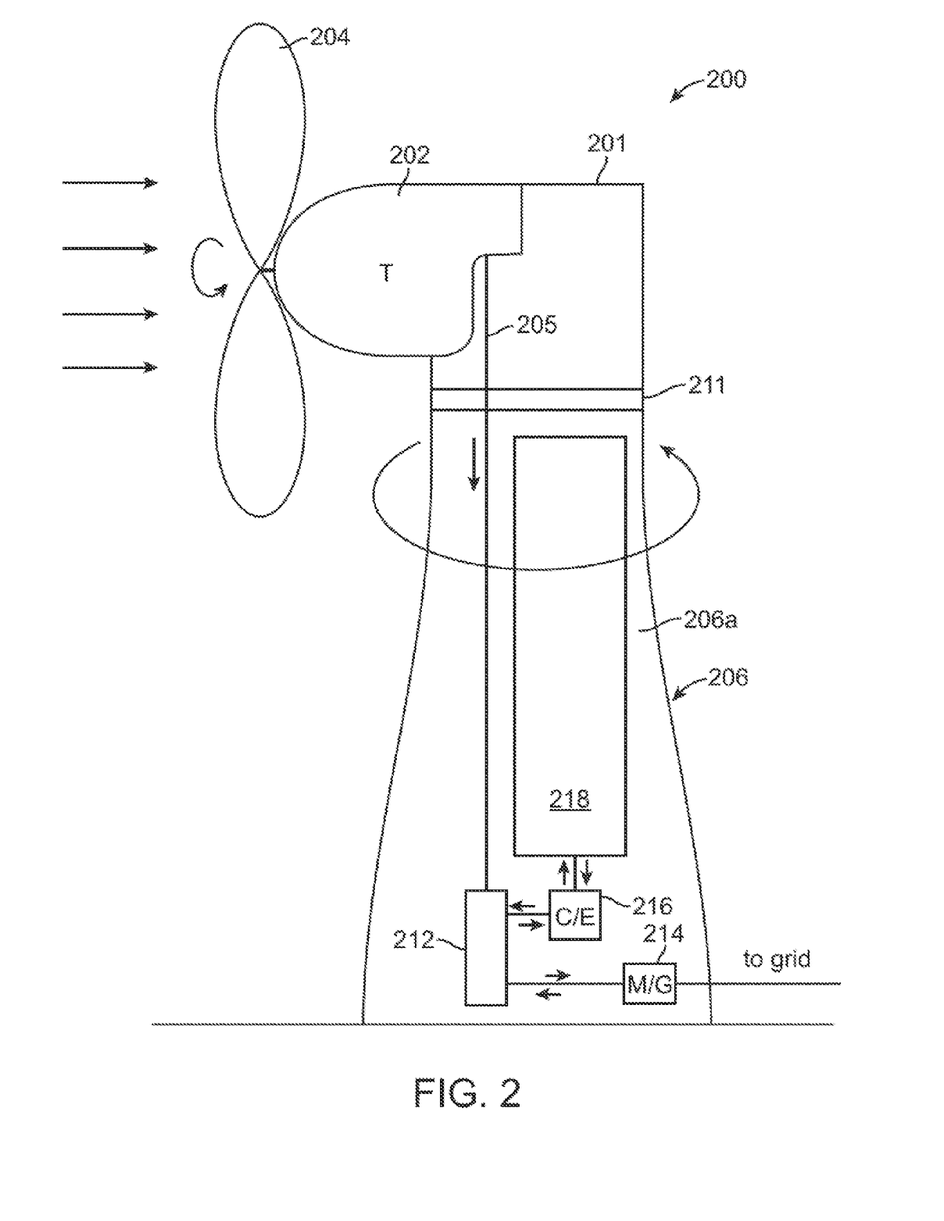
FIG. 2 is a simplified schematic representation of an alternative embodiment of a system in accordance with the present invention.

According to alternative embodiments, however, one or more of the gear system, the compressor/expander, and the motor/generator may be positioned outside of the nacelle. FIG. 2 shows a simplified view of such an alternative embodiment of a system 200 in accordance with the present invention.

In this embodiment, while the turbine 202 is positioned in the nacelle 201, the gear system 212, compressor/expander 216, and motor generator 214 are located at the base of the tower 206. This placement is made possible by the use of an elongated linkage 205 running between turbine 202 and gear system 212. Elongated linkage 205 may be mechanical, hydraulic, or pneumatic in nature.

The design of the embodiment of FIG. 2 may offer some additional complexity, in that the linkage 205 traverses rotating joint 211 and accordingly must be able to accommodate relative motion of the turbine 202 relative to the gear system 212. Some of this complexity may be reduced by considering that linkage 205 is limited to communicating energy in only one direction (from the turbine to the gear system).

Moreover, the cost of complexity associated with having linkage 205 traverse rotating joint 211, may be offset by the ease of access to the motor/generator, compressor/expander, and gear system. Specifically, these elements include a large number of moving parts and are subject to wear. Positioning these elements at the base of the tower (rather than at the top) facilitates access for purposes of inspection and maintenance, thereby reducing cost.

Still other embodiments are possible. For example, while FIG. 2 shows the gear system, motor/generator, and compressor/expander elements as being housed within the support structure, this is not required. In other embodiments, one or more of these elements could be located outside of the support structure, and still communicate with the wind turbine through a linkage extending from the support tower. In such embodiments, conduits for compressed air and for electricity, and mechanical, hydraulic, or pneumatic linkages could provide for the necessary communication between system elements.

Embodiments of the present invention are not limited to the particular elements described above. For example, while FIGS. 1 and 2 show compressed gas storage system comprising compressor/expander elements and motor/generator elements having combined functionality, this is not required by the present invention.

Figure 3:
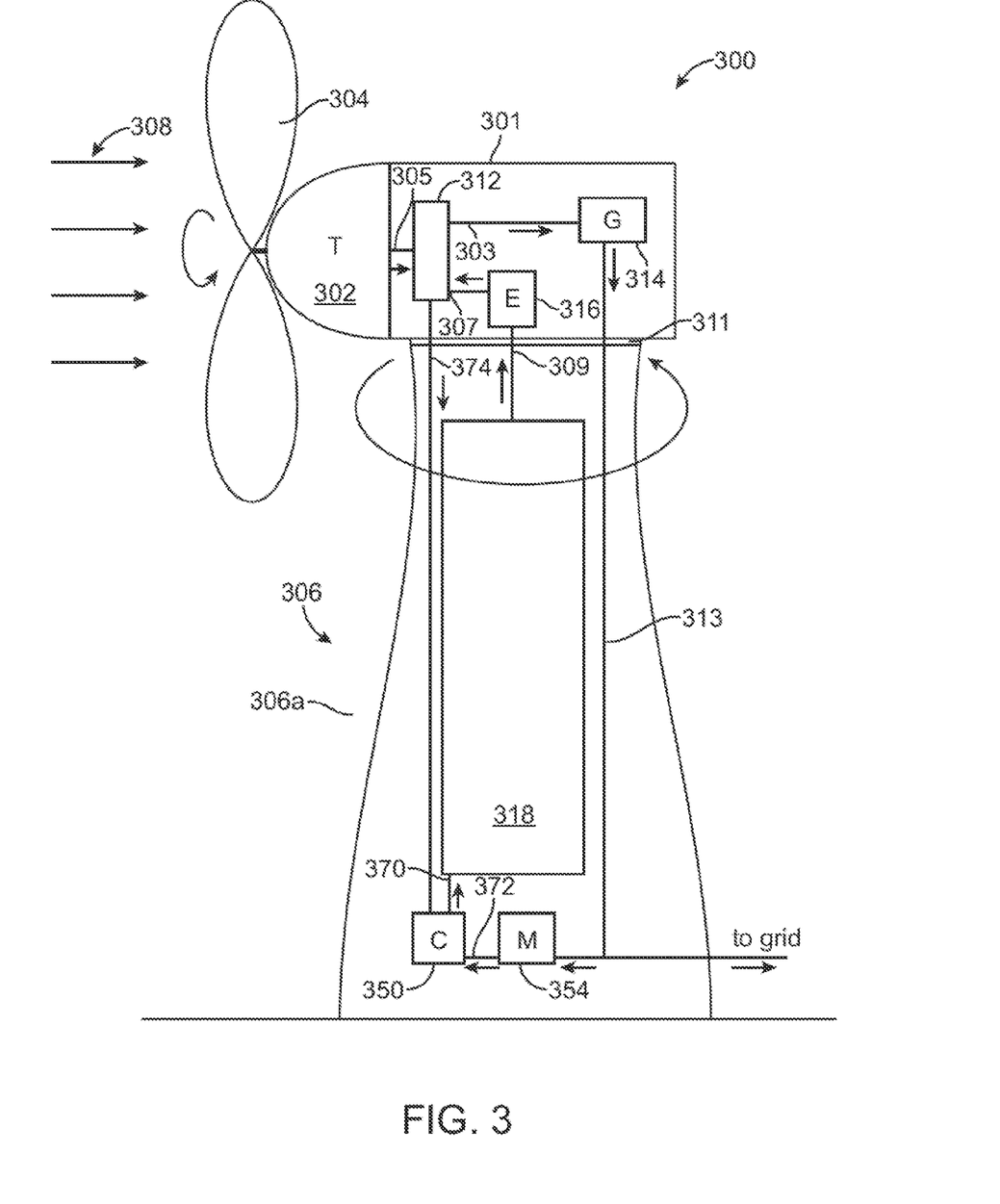
FIG. 3 is a simplified schematic representation of an alternative embodiment of a system in accordance with the present invention.

FIG. 3 shows an alternative embodiment a system 300 according to the present invention, utilizing separate, dedicated compressor 350, dedicated expander 316, dedicated motor 354, and dedicated generator 314 elements. Such an embodiment may be useful to adapt an existing wind turbine to accommodate a compressed gas storage system.

Specifically, pre-existing packages for wind turbines may feature the dedicated generator element 314 in communication with the turbine 302 through gear system 312 and linkages 303 and 305. Generator 314, however, is not designed to also exhibit functionality as a motor.

To such an existing configuration, a dedicated expander 316, a dedicated compressor 350, a dedicated motor 354, linkages 307 and 373, and conduit 370 may be added to incorporate a compressed gas storage system. In one embodiment, a dedicated expander 316 may be positioned in the nacelle 301 in communication with the gear system 312 through linkage 307. Dedicated expander 316 is in fluid communication with a top portion of the compressed gas storage chamber 318 defined within the walls 306a of support tower 306 through conduit 309.

Dedicated compressor 350 and a dedicated motor 354 are readily included, for example at or near the base of the support tower, thereby facilitating access to these elements. Dedicated compressor 350 is in fluid communication with storage chamber 318 through conduit 370, and in physical communication with dedicated motor 354 through linkage 372. Dedicated motor 354 is in turn in electronic communication with the generator and/or grid to receive power to operate the compressor to replenish the supply of compressed gas stored in the chamber 318.

As shown in FIG. 3, this embodiment may further include an optional elongated mechanical, hydraulic, or pneumatic linkage 374 extending between the gear system 312 in the nacelle 301, and the dedicated compressor 350 located outside of the nacelle 301. Such a linkage would allow the dedicated compressor to be directly operated by the output of the turbine, avoiding losses associated with converting mechanical into electrical form by the dedicated generator, and re-converting the electrical power back into mechanical form by the dedicated motor in order to operate the compressor.

Figure 3A:
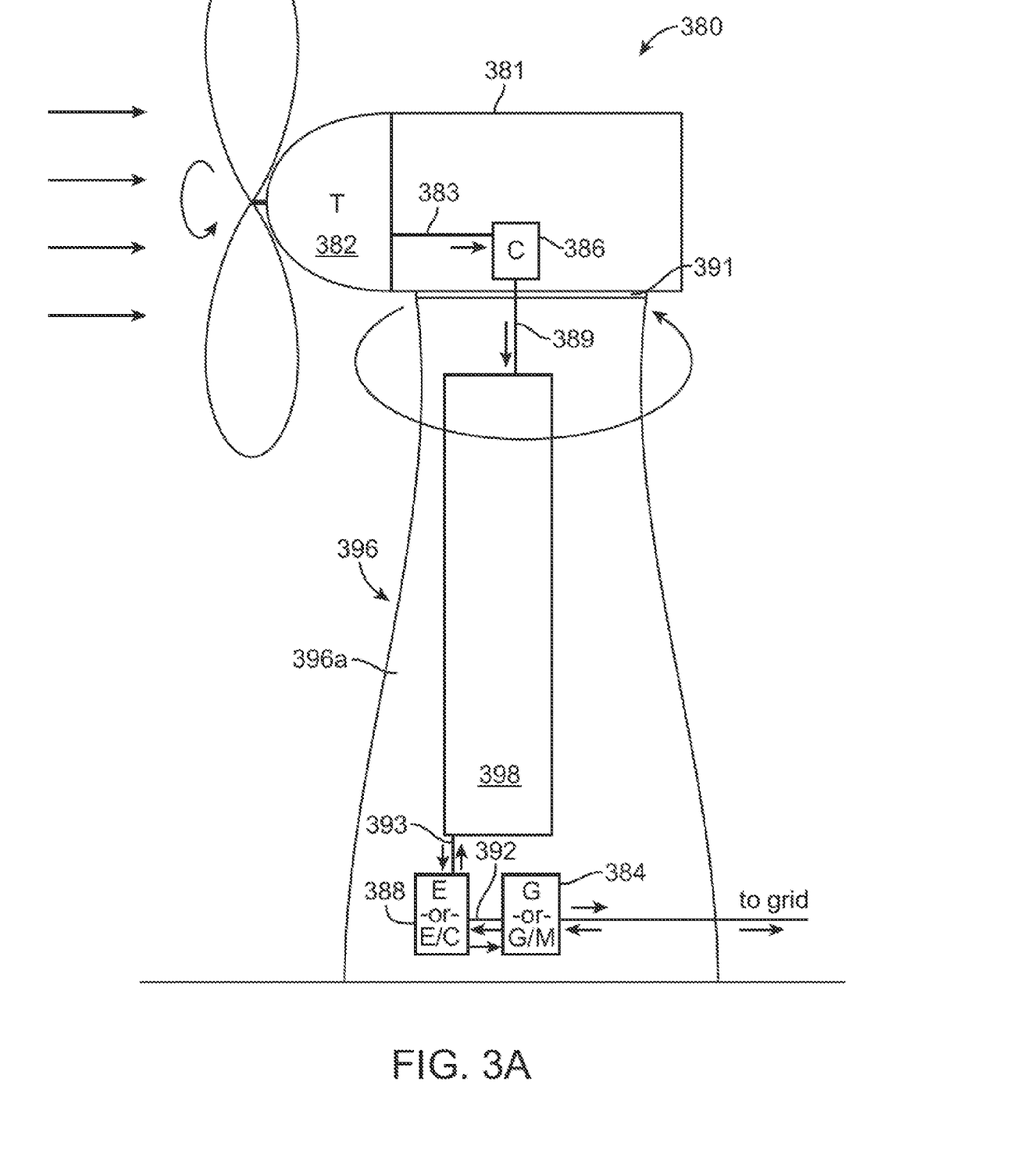
FIG. 3A is a simplified schematic representation of an alternative embodiment of a system in accordance with the present invention.

FIG. 3A shows a simplified view of yet another embodiment of a system in accordance with the present invention. In the embodiment of the system 380 of FIG. 3A, only the turbine 382, linkage 383, and dedicated compressor 386 elements are located in the nacelle 381 that is positioned atop support tower 396. Dedicated compressor 386 is in communication with the turbine through linkage 383 (which may be mechanical, hydraulic, or pneumatic), which serves to drive compression of air by the dedicated compressor. Compressed air output by the dedicated compressor is flowed through conduit 389 across joint 391 into chamber 398 present in the support tower 396.

The remaining elements are positioned outside of the nacelle, either in the support tower, or alternatively outside of the support tower. For example, a dedicated expander or expander/compressor 388 is in communication with the chamber 398 defined within walls 396a, to receive compressed air through conduit 393. Element 388 is configured to allow expansion of the compressed air, and to communicate energy recovered from this expansion through linkage 392 to generator or generator/motor 384. Element 384 in turn operates to generate electricity that is fed onto the grid.

The embodiment of FIG. 3A can also function to store energy off of the grid. Where element 384 is a generator/motor and element 388 is an expander/compressor, element 384 may operate as a motor to drive element 388 operating as a compressor, such that air is compressed and flowed into chamber 398 for storage and later recovery.

The embodiment of FIG. 3A offers a potential advantage in that power is transported from the top to the bottom of the tower utilizing the chamber, without requiring a separate elongated linkage or conduit. Another possible advantage of the embodiment of FIG. 3A is a reduction in the weight at the top of the tower. While this embodiment may incur losses where the mechanical power output of the turbine is converted first into compressed air and then back into mechanical power for driving the generator, such losses may be offset by a reduction in weight at the top of the tower, allowing the tower to be higher and to access more wind power.

The present invention is not limited to a support structure having any particular shape. In the particular embodiments shown in FIGS. 1 and 2, the support structure exhibits a cross-sectional shape that varies along its length. For example, the support structure 106 is wide at its base, and then tapers to a point at which it meets the wind turbine. By allocating material to where it will best serve the supporting function, such a design minimizes materials and reduces cost.

Figure 4:
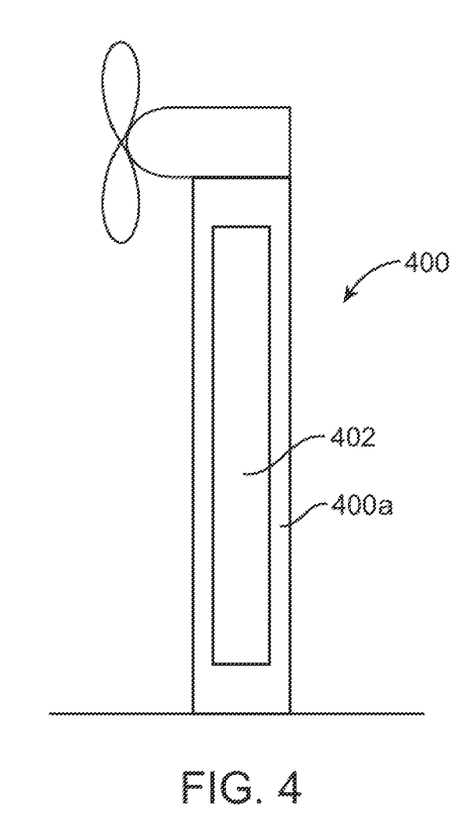
FIG. 4 is a simplified schematic representation of an alternative embodiment of a system in accordance with the present invention.

However, the present invention also encompasses supporting structures having other shapes. For example, FIG. 4 shows a support structure 400 comprising a hollow tube having a circular or elliptical cross section that is substantially uniform. The walls 400a of this hollow tube 400 in turn define a chamber 402 for storing compressed gas. While possibly utilizing more mass, such a tube is a simpler structure that is employed for a various applications in many other industries. Accordingly, such a tube is likely available at a relatively low price that may offset any greater material cost.

Still further alternative embodiments are possible. For example, in certain embodiments a support structure may be designed to take advantage of the forces exerted by the compressed air stored therein, in order to impart additional stability to the support structure.

Figure 5:
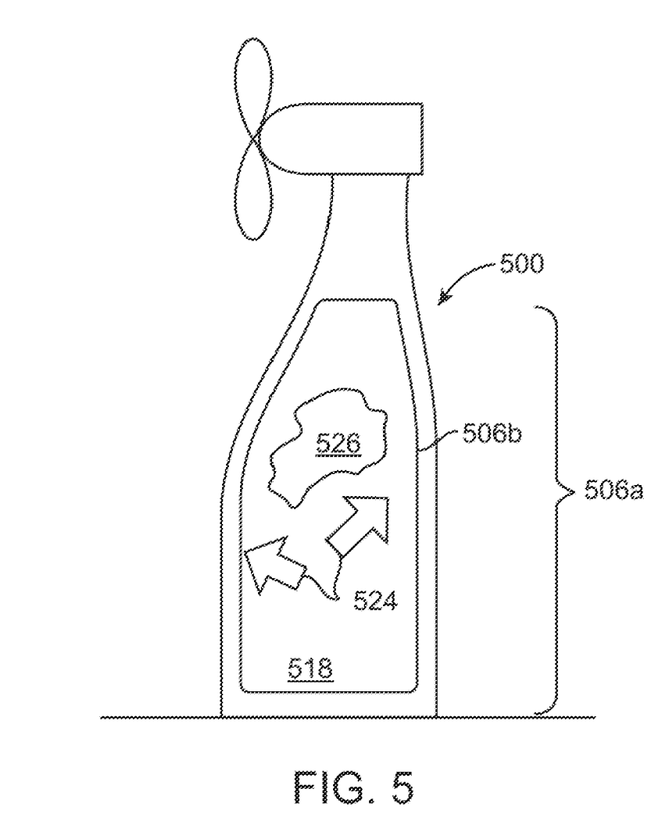
FIG. 5 is a simplified schematic representation of an alternative embodiment of a system in accordance with the present invention.

Thus, FIG. 5 shows an embodiment wherein the support structure 500 comprises a portion 506a having thinner walls 506b exhibiting less inherent strength than those of the prior embodiments. This reduced strength may be attributable to one or more factors, including but not limited to, use of a different design or shape for the support, use of a reduced amount of material in the support, or use of a different material in the support.

According to embodiments of the present invention, however, any reduction in the inherent strength of the support structure 506 may be offset by expansion forces 524 exerted by the compressed air 526 that is contained within the chamber 518. Specifically, in a manner analogous to the stiffening of walls of an inflated balloon, the expansion force of the compressed air may contribute additional strength to the support structure. This expansion effect is shown grossly exaggerated in FIG. 5, for purposes of illustration.

One possible application for such a design, employs a support structure that is fabricated from a material that is capable of at least some flexion, for example carbon fiber. In such an embodiment, expansion forces from the compressed air within the chamber of a flexible support member, may act against the walls of the chamber, thereby stiffening it and contributing to the structural stability of that support. Such a support structure could alternatively be formed from other materials, and remain within the scope of the present invention.

A design incorporating carbon fiber could offer even further advantages. For example, carbon fiber structures may exhibit enhanced strength in particular dimensions, depending upon the manner of their fabrication. Thus, a carbon fiber support structure could be fabricated to exhibit strength and/or flexion in particular dimensions, for example those in which the expansion forces of the compressed air are expected to operate, and/or dimension in which the support is expected to experience external stress (e.g. a prevailing wind direction).

Of course, a design taking advantage of expansion forces of the stored compressed air, would need to exhibit sufficient inherent strength in the face of expected (and unexpected) changes in the quantity of compressed air stored therein, as that compressed air is drawn away and allowed to expand for energy recovery. Nevertheless, expansion forces associated with minimal amounts of compressed air remaining within the support structure, could impart sufficient stability to support structure to reduce its cost of manufacture and maintenance.

What is claimed is:

1. An apparatus comprising:
a support structure configured to elevate a wind turbine above the ground, the support structure comprising walls defining a chamber configured to be in fluid communication with a gas compressor operated by the wind turbine, the chamber also configured to store gas compressed by the compressor, the apparatus further comprising a nacelle in rotational communication with the support structure through a joint, the nacelle housing the turbine, the apparatus further comprising a gear system, a generator, a first physical linkage between the generator and the gear system, an expander in fluid communication with the chamber, a second physical linkage between the expander and the gear system, and a third physical linkage between the turbine and the gear system, wherein the gear system, the generator, the first physical linkage, the expander, and the second physical linkage are located outside the nacelle, and wherein the third physical linkage traverses the joint.

2. The apparatus of claim 1 wherein the support structure comprises a hollow tube.

3. The apparatus of claim 2 wherein the hollow tube exhibits a cross-section that is substantially constant along its length.

4. The apparatus of claim 1 wherein the generator comprises a motor/generator, and the expander comprises a compressor/expander.

5. The apparatus of claim 1 wherein the generator comprises a dedicated generator, and the expander comprises a dedicated expander.

6. The apparatus of claim 1 wherein the gear system comprises a planetary gear system.

7. The apparatus of claim 1 wherein the generator comprises a motor/generator.

8. The apparatus of claim 1 wherein the expander comprises a compressor/expander.

9. The apparatus of claim 1 wherein the generator comprises a dedicated generator.

10. The apparatus of claim 1 wherein the expander comprises a dedicated expander.

11. The apparatus of claim 1 wherein the third physical linkage comprises a mechanical linkage.

12. The apparatus of claim 11 wherein the third physical linkage comprises a rotating shaft.

13. The apparatus of claim 1 wherein the third physical linkage comprises a hydraulic linkage.

14. The apparatus of claim 1 wherein the third physical linkage comprises a pneumatic linkage.

15. The apparatus of claim 1 wherein the gear system is located outside of the support structure.

16. The apparatus of claim 1 wherein the expander is located outside of the support structure.

17. The apparatus of claim 1 wherein the generator is located outside of the support structure.

18. The apparatus of claim 1 wherein the compressor is located outside of the support structure.

* * * * *